(12) United States Patent
Csonka et al.

(10) Patent No.: US 11,606,160 B1
(45) Date of Patent: Mar. 14, 2023

(54) POWER CONTROL LOOP FOR STABILIZATION OF LINK POWER

(71) Applicant: X Development LLC, Mountain View, CA (US)

(72) Inventors: Paul Csonka, Sunnyvale, CA (US); Travis Lantz, Dublin, CA (US); Baris Ibrahim Erkmen, Sunnyvale, CA (US); Devin Brinkley, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/572,027

(22) Filed: Jan. 10, 2022

(51) Int. Cl.
*H04J 14/02* (2006.01)
*H04B 10/079* (2013.01)
*H04B 10/112* (2013.01)

(52) U.S. Cl.
CPC .... *H04J 14/0221* (2013.01); *H04B 10/07955* (2013.01); *H04B 10/1123* (2013.01)

(58) Field of Classification Search
None
See application file for complete search history.

(56) References Cited

U.S. PATENT DOCUMENTS

| | | | |
|---|---|---|---|
| 6,239,888 | B1 | 5/2001 | Willebrand |
| 7,092,636 | B2 | 8/2006 | Doucet et al. |
| 9,716,551 | B2 | 7/2017 | Wang et al. |
| 10,225,006 | B1 | 3/2019 | Ulander et al. |
| 10,637,579 | B1 | 4/2020 | Csonka et al. |
| 11,159,249 | B2 | 10/2021 | Moision et al. |
| 2001/0005273 | A1* | 6/2001 | Fischer ............... H04B 10/118 398/121 |
| 2007/0031151 | A1* | 2/2007 | Cunningham ..... H04B 10/1127 398/131 |

(Continued)

OTHER PUBLICATIONS

Ghassemlooy, Zabih, et al., "Guest Editorial Optical Wireless Communication Systems", Optik, Elsevier journal, DOI: https://doi.org/10.1016/j.ijleo.2017.11.052, 2017, pp. 1-6.

(Continued)

*Primary Examiner* — David W Lambert
(74) *Attorney, Agent, or Firm* — Botos Churchill IP Law

(57) ABSTRACT

The technology employs a state-based power control loop (PCL) architecture to maintain tracking and communication signal-to-noise ratios at suitable levels for optimal tracking performance and data throughput in a free-space optical communication system. Power for a link is adjustable to stay within a functional range of receiving sensors in order to provide continuous service to users. This avoids oversaturation and possible damage to the equipment. The approach can include decreasing or increasing the power to counteract a surge or drop while maintaining a near constant received power at a remote communication device. The system may receive power adjustment feedback from another communication terminal and perform state-based power control according to the received feedback. This can include re-initializing and reacquiring a link with the other communication terminal automatically after loss of power, without human intervention. There may be a default state and discrete states including rain, fade, surge and unstable states.

20 Claims, 10 Drawing Sheets

(56) References Cited

U.S. PATENT DOCUMENTS

| | | | | |
|---|---|---|---|---|
| 2011/0274432 A1* | 11/2011 | Cunningham | ....... | H04B 10/112 398/96 |
| 2016/0112124 A1* | 4/2016 | Juarez | ................ | H04B 10/112 398/118 |
| 2020/0228201 A1 | 7/2020 | Brinkley et al. | | |
| 2020/0235817 A1* | 7/2020 | Csonka | .............. | H04B 10/0799 |
| 2020/0389232 A1* | 12/2020 | Danesh | .............. | H04B 10/1123 |
| 2021/0083768 A1 | 3/2021 | Lantz et al. | | |

OTHER PUBLICATIONS

Gubergrits, Michael, et al., "Adaptive Power Control for Satellite to Ground Laser Communication", ECI Telecom Ltd., 2007, pp. 1-24.

Hitam, Salasiah, et al., "Performance Analysis on 16-Channels Wavelength Division Multiplexing in Free Space Optical Transmission under Tropical Regions Environment", Journal of Computer Science 8(1): pp. 145-148, 2012, ISSN 1549-3636.

Khalighi, Mohammad Ali, et al., "Survey on Free Space Optical Communication: A Communication Theory Perspective", IEEE Communication Surveys & Tutorials, vol. 16, No. 4, Fourth Quarter 2014, pp. 2231-2258.

Leibowitz, Brian S., et al., "A 256-Element CMOS Imaging Receiver for Free-Space Optical Communication", IEEE Journal of solid-State Circuits, vol. 40, No. 9, 2005, pp. 1948-1956.

Moision, Bruce, et al., "Demonstration of free-space optical communication for long-range data links between balloons on Project Loon", Downloaded From: http://proceedings.spiedigitallibrary.org/ on Mar. 2, 2017, pp. 1-14.

Pavel, Lacra, "Control Design for Transient Power and Spectral Control in Optical Communication Networks", Research Gate, SOI: 10.1109/CCA.2003.1223427, IEEE, 2003, pp. 1-9.

Zaatari, Mohammed, "Wireless Optical Communications Systems in Enterprise Networks", The Telecommunications Review 2003, pp. 49-57.

* cited by examiner

100

400

500

600

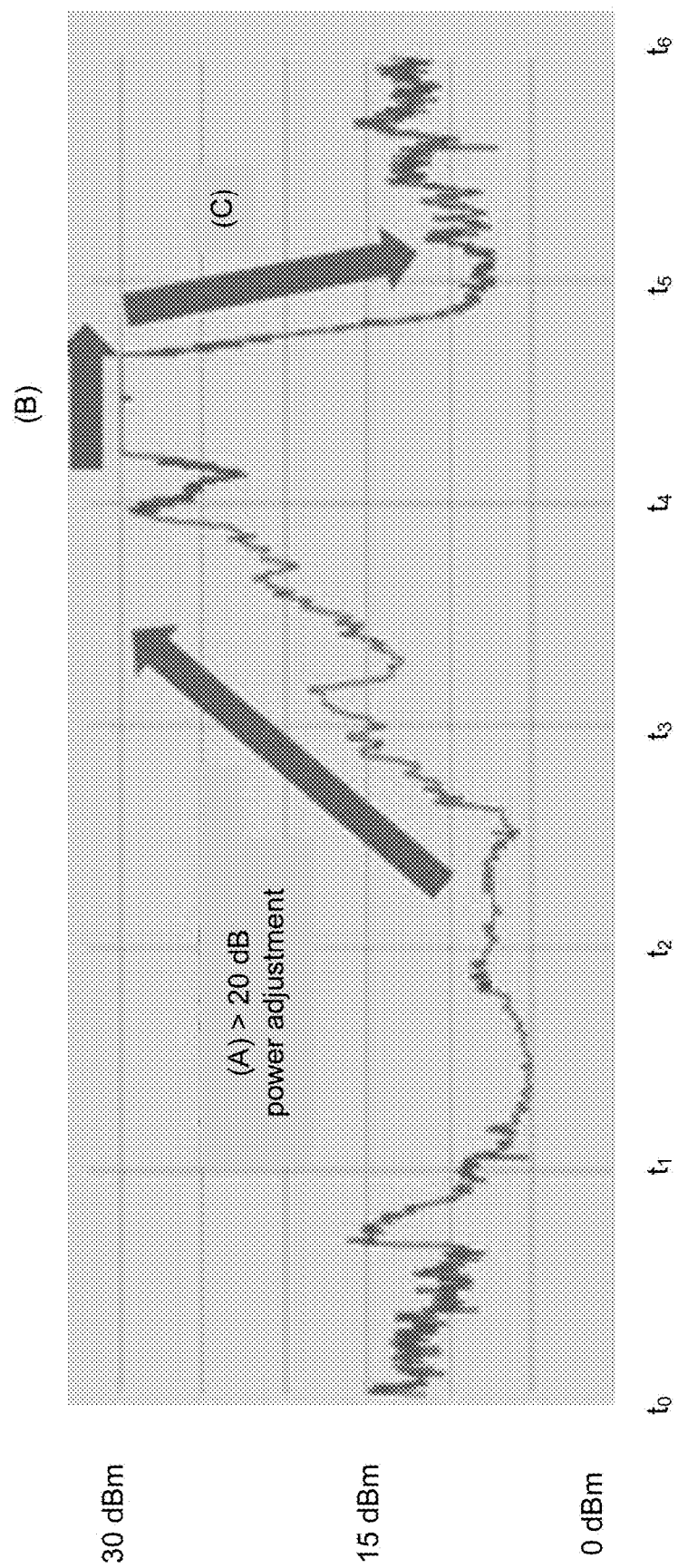

800

900

POWER CONTROL LOOP FOR STABILIZATION OF LINK POWER

BACKGROUND

Certain types of communication terminals transmit and receive optical signals through free space optical communication (FSOC) links. In order to accomplish this, such terminals may use acquisition and tracking systems to establish the optical link by pointing optical beams from different terminals towards one another. For instance, a first, transmitting terminal may use a beacon laser to illuminate a second, receiving terminal. The receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

Properties of the optical link can vary due to weather events, time of day and other factors. This can adversely affect the signal-to-noise (SNR) ratio of the link. Power control may be employed in order to correct for changes in the SNR so that the received power is maintained in a suitable range. However, it is possible to under-correct or over-correct, which may lead to saturation or damage to photodetectors that are sensitive to high peak irradiance. These and other issues with inadequate power control can degrade communication links of the FSOC system, reducing throughput and downgrading overall performance.

BRIEF SUMMARY

The technology employs a power control loop (PCL) architecture in order to maintain tracking and communications laser SNRs at suitable levels for optimal tracking performance and optimal data throughput in an FSOC system, such as a terrestrial system having two or more wireless optical communication terminals that may be positioned tens of kilometers apart. A state-based algorithm is employed with adaptive setpoints and other beneficial features.

Optical communication channel properties may vary due weather events, e.g., over a large range such as up to 40 dB or more, and may fluctuates with different day/night properties depending on link distance. According to aspects of the technology, an autonomous PCL correction mechanism can be employed in such situations to maintain received power in valid ranges (e.g., sufficient SNR satisfying one or more threshold criteria according to different setpoints). This approach allows for targeted adjustments for both communication and beacon channels, and can avoid saturation and photodetector damage due to peak irradiance issues.

According to one aspect, a communication terminal is configured to receive free space optical signals. The communication terminal comprises a beam splitter, a position-sensing detector, an optical attenuator, a power monitoring block, and at least one photodiode. The beam splitter is configured to split an input optical beam received from another communication terminal into a beacon wavelength and one or more communication wavelengths. The position-sensing detector is configured to receive the beacon wavelength from the beam splitter and to determine target tracking location information. The optical attenuator is configured to receive the one or more communication wavelengths from the beam splitter and to attenuate at least one of the one or more communication wavelengths. The power monitoring block is configured to receive the determined target tracking location information and to output a control signal to adjust the optical attenuator for the attenuation of the at least one of the one or more communication wavelengths. The at least one photodiode is configured to receive the attenuated at least one communication wavelength and output one or more detected communication signals. The power monitoring block is further configured to receive power adjustment feedback from a power control block of the other communication terminal and to perform state-based power control of the communication terminal according to the received power adjustment feedback. The power monitoring block of the communication terminal may be further configured to receive the one or more detected communication signals output by the at least one photodiode.

The one or more communication wavelengths may comprise a plurality of communication wavelengths. In this case, the at least one photodiode is a plurality of photodiodes each configured to receive one of the plurality of communication wavelengths, and the optical attenuator may be configured to separately attenuate each of the plurality of communication wavelengths. In this scenario, the communication terminal may further comprise a demultiplexer configured to receive each of the plurality of communication wavelengths from the optical attenuator and to demultiplex the plurality of communication wavelengths prior to reception by the plurality of photodiodes.

The feedback may be an in-band optical signal. Alternatively, the feedback may be an out-of-band radio frequency signal.

The power monitoring block may be configured to calculate a center of a focused spot on a sensor plane for the input optical beam. Alternatively or additionally, the power monitoring block may be further configured to provide outbound power adjustment feedback to the power control block of the other communication terminal.

The received power adjustment feedback may include at least one of a terminal control state, terminal motion, a power statistic, or a tracking statistic.

Alternatively or additionally to any of the above arrangements, the state-based power control may comprise a default state and multiple discrete states including a rain state, a fade state, a surge state and an unstable state.

According to another aspect, a state-based method of controlling a communication terminal configured to receive free space optical signals is provided. The method comprises: splitting an input optical beam received from another communication terminal into a beacon wavelength and one or more communication wavelengths; determining target tracking location information based on beacon information from the beacon wavelength; attenuating at least one of the one or more communication wavelengths, the attenuation being adjusted based on the determined target tracking location information; outputting one or more detected communication signals based on the attenuated at least one of the one or more communication wavelengths; receiving power adjustment feedback from another communication terminal; and performing state-based power control of the communication terminal according to the received power adjustment feedback.

In one example, performing the state-based power control includes re-initializing and reacquiring a link with the other communication terminal automatically after loss of power, without human intervention. The state-based power control may be performed based on (i) at least one of a course pointing mirror angle or a fast steering mirror angle as a starting value, and (ii) at least one of an amplifier or an attenuator setting for power output. Alternatively or additionally, the state-based power control may include bounding output power based on at least one of a distance from link setup or a channel temperature. Alternatively or additionally, the state-based power control may comprise a default state and multiple discrete states including a rain state, a fade state, a surge state and an unstable state. Here, the multiple discrete states may further include an entry state during initial link acquisition, automated recovery or when the link is down due to an atmospheric condition. Alternatively or additionally, operation in the rain state includes looking for an error in a tracking system of the communication terminal where position feedback indicates that tracking satisfies a selected criterion but the communication terminal is unable to maintain sufficient light into a communication channel. Alternatively or additionally, operation in the unstable state includes the communication terminal reactively using variance of power information received from the other communication terminal to detect unstable tracking of the other communication terminal. Alternatively or additionally, operation in the fade state includes detecting when an update rate of control of an attenuator or an amplifier of the communication terminal is insufficient to stabilize received power for the other communication terminal. Alternatively or additionally, operation in the surge state includes evaluating power saturation conditions associated with either the communication terminal or the other communication terminal.

BRIEF DESCRIPTION OF THE DRAWINGS

FIGS. 7A-B illustrate dynamic power adjustment from an operating link while employing state-based power control in accordance with aspects of the technology.

DETAILED DESCRIPTION

Overview

Figure 1:
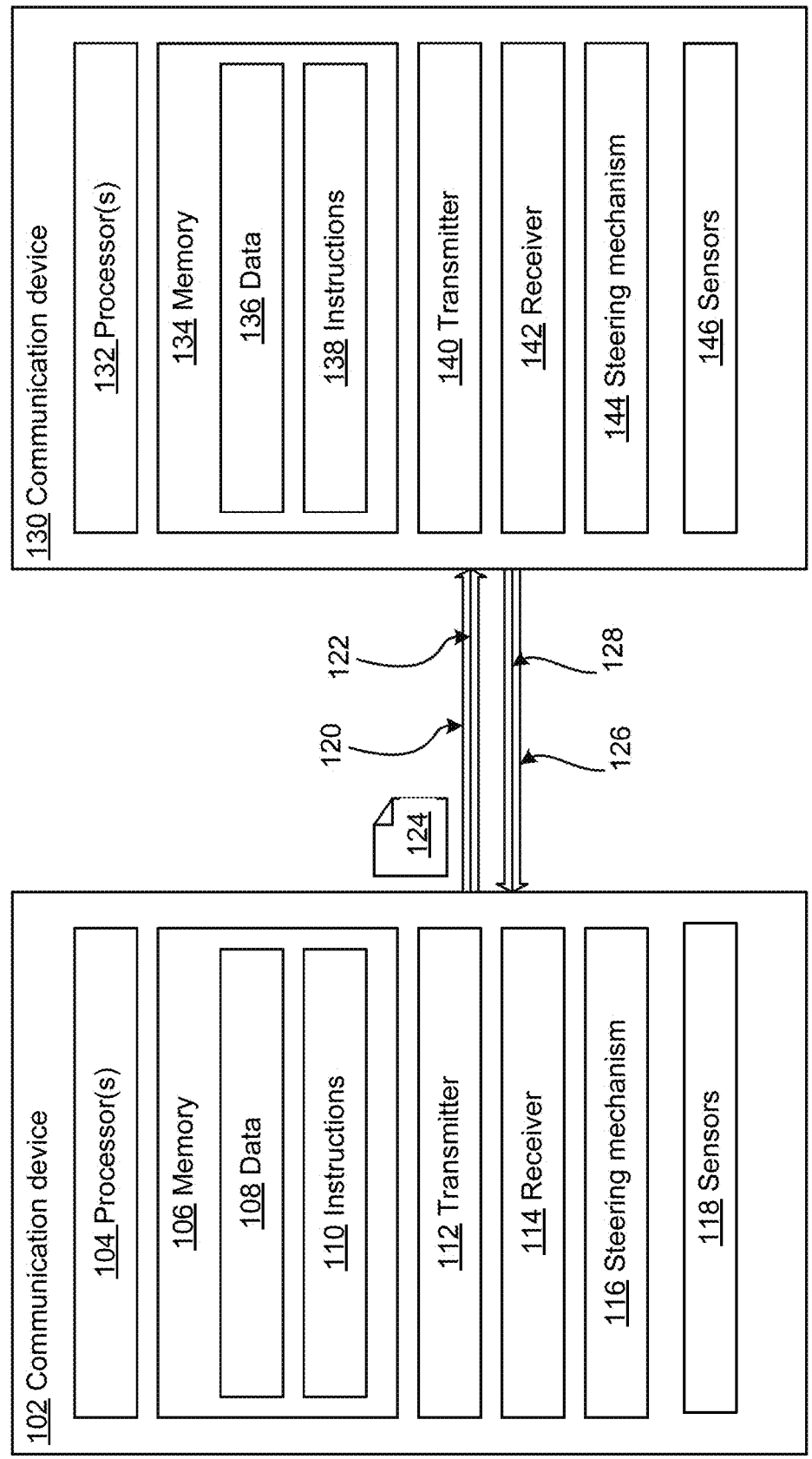
FIG. 1 is a block diagram 100 of an exemplary communication system in accordance with aspects of the disclosure.

The technology relates to a communication system configured to adjust the power of a communication link based on disturbances to the communication system. Power for a link should be adjusted to stay within a functional range of receiving sensors in order to provide continuous service to users. In particular, power should be high enough for the sensors to detect incoming signals but not so high as to oversaturate and possibly damage the sensors in the communication system. Atmospheric angle-of-arrival and attenuation fluctuations, as well as pointing angle fluctuations introduced by a line-of-sight beam tracking system, may cause the power received at a remote terminal to surge or drop. The communication system may be able to decrease or increase the power to counteract a surge or drop and maintain a constant or near constant received power at a remote communication device.

The features, described in more detail below, may provide for a communication system that is able to maintain communication links at selected received power levels, even in variable environments. The system may operate in highly-varying environmental conditions autonomously without human intervention. There are several automation features that provide operational robustness and resilience in the field. For instance, the system can support automatic adjustment of transmitter power over, e.g., a 30 dB dynamic range (or more or less), as channel attenuation varies due to changing weather conditions. It may be configured to monitor averaged incident power at receiver photodetectors to provide automated conditioning of received optical power. The system may also enable automatic restart and reacquisition of a link after a long outage (e.g., due to power loss or fog).

An FSOC system as described herein may be, in one scenario, a terrestrial-based system having two or more wireless optical communication terminals arranged at different locations. By way of example, this can support existing terrestrial broadband infrastructure, and enable access to abundant and affordable broadband internet to under-connected populations across the world. In one particular situation, the system may provide up to 20 Gbps (gigabit-per-second) bidirectional full-duplex throughput, with up to 20 km of line-of-sight (LOS) deployment, where a relay configuration for non-LOS can also be supported. In this configuration, the system may employ laser wavelengths operating in the near-infrared spectrum around 1550 nm (e.g., +/− up to 10%) with class 1M eye safe at the aperture, using small low-power FSOC terminals that can be easily deployed. For instance, the terminal itself (absent mounting hardware) may be less than about 15 kg, with a typical power consumption on the order of 40 W, up to a maximum of 60 W.

In this example scenario, the system may employ on-off keying (OOK) modulation and direct detection, with dual-stage continuous active line-of-sight tracking. There may be orders of magnitude reserve power margin (e.g., approximately 45 dB at 10 km) to maintain operational link through poor visibility conditions. The system supports automatic adaptation of link parameters to variations in the environmental conditions (e.g., transmitter power optimization, acquisition and re-acquisition of link, auto-recovery from power loss), as well as using an adaptive throughput modem with Automatic Repeat Request (ARQ) protocol for immunity against burst errors. The system may also provide support for hybrid radio frequency-wireless optical communication (RF-WOC) or optical fiber-WOC architectures for additional availability.

Example Systems

General Terminal Architecture

FIG. 1 is a block diagram 100 of a first communication device 102 of a first communication terminal configured to form one or more links with a second communication device 130 of a second communication terminal, for instance as part of a free-space optical communication (FSOC) system. In this example, the first communication device 102 includes as components one or more processors 104, a memory 106 storing data 108 and instructions 110, a transmitter 112, a receiver 114, a steering mechanism 116, and one or more sensors 118. The first communication device 102 may include other components not shown in FIG. 1.

The one or more processors 104 may be hardware-based processors, such as commercially available central processing units (CPUs), microcontrollers or digital signal processors (DSPs). Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including the data 108 and instructions 110, which may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, state information may be stored, such as state information for tracking a signal and performing power control as discussed herein.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below, for instance regarding a state-based algorithm configured to implement a power control loop.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, communication data and/or beacon information via one or more signals, and also may be configured to receive, via the receiver 114, communication data and/or beacon information in one or more other signals. The received signal(s) may be processed by the one or more processors 104 to extract the communications data and/or beacon information.

As shown in FIG. 1, the transmitter 112 of the first communication device 102 is configured to output a beacon beam 120 to establish a communication link 122 with the second communication device 130, which receives the beacon beam 120. The first communication device 102 may align the beacon beam 120 co-linearly with the optical communication beam (not shown) that may have a narrower solid angle or the same angle as the beacon beam 120 and carries a communication signal 124. As such, when the second communication device 130 receives the beacon beam 120, the second communication device 130 may establish a line-of-sight link with the first communication device 102 or otherwise align with the first communication device. As a result, the communication link 122 that allows for the transmission of the optical communication beam (not shown) from the first communication device 102 to the second communication device 130 may be established.

The transmitter 112 may include an optical transmitter, an amplifier, and an attenuator. As shown in the example architecture 200 of FIG. 2, the transmitter 112 of communication device 102 includes a seed laser 202 configured to provide an amount of bandwidth for an output signal, an amplifier 204 such as an Erbium-doped fiber amplifier (EDFA) configured to increase an amplitude of the output signal(s) from the seed laser 202, and an attenuator 206 such as a variable optical attenuator (VOA) that may be a single mode variable optical attenuator (SMVOA) or a multi-mode VOA (MMVOA) that is configured to decrease the amplitude of the output signal. The output of the attenuator 206 is fed into the amplifier 204 along with the seed laser output signals. Via this architecture, the transmitter 112 may be configured to output the beacon beam 120 that allows one communication device to locate another, as well as one or more communication signals over one or more communication links 122. The output signal from the transmitter 112 may therefore include the beacon beam 120, the communication signal(s) 122, or both. The communication signal(s) may be a signal configured to travel through free space, such as, for example, an RF signal or an optical signal, as shown by propagation path 208. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 120 may illuminate the same or a larger solid angle in space than the optical communication beam used in the communication link 122, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

Figure 2:
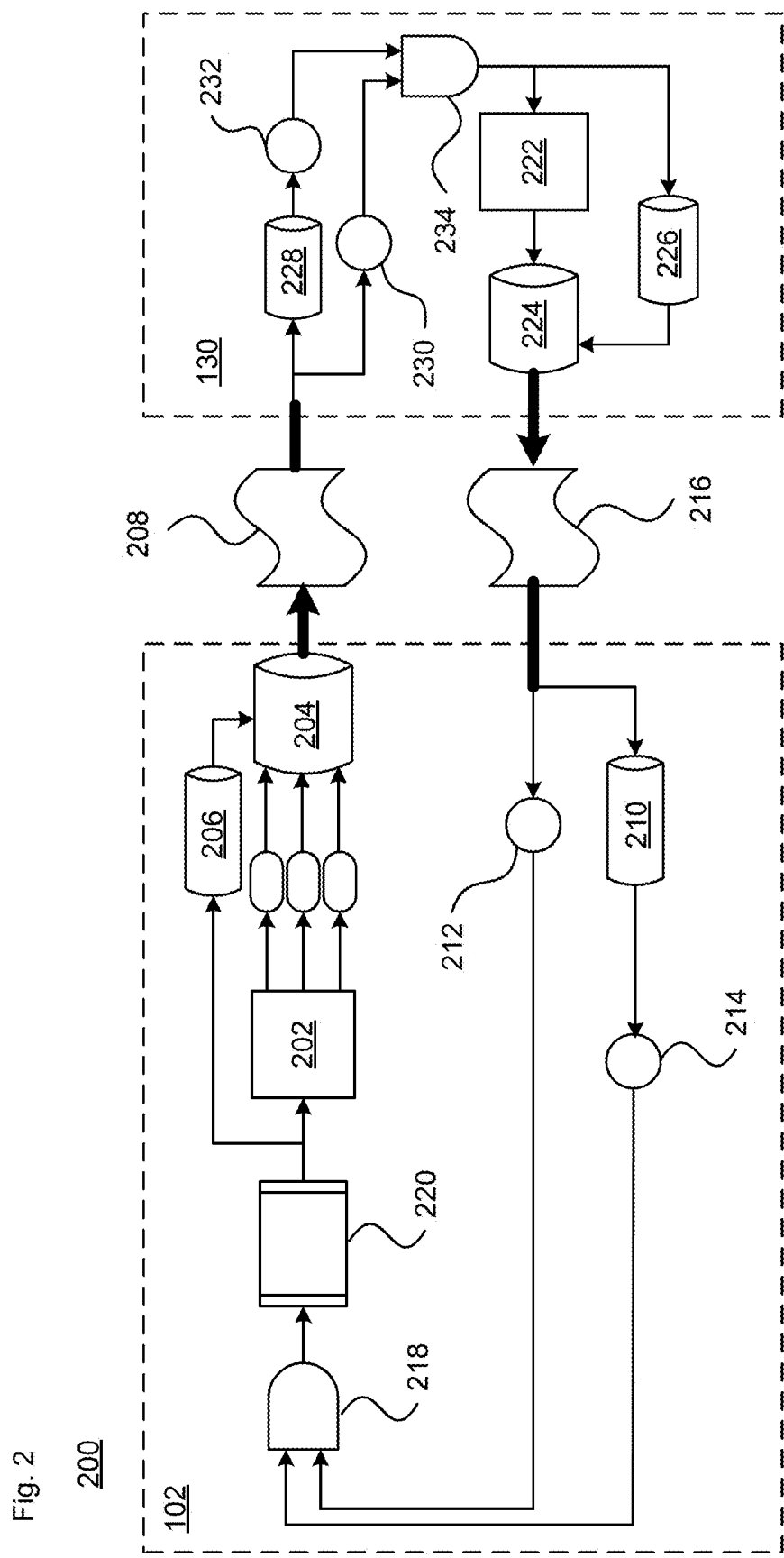
FIG. 2 is a pictorial diagram of components of the first communication device and the second communication device of FIG. 1 in accordance with aspects of the disclosure.

The receiver 114 of communication device 102 includes a tracking system configured to detect a received optical signal from a remote transmitter. As shown in FIG. 2, the receiver 114 for the optical communication system may include an attenuator 210 such as a multi-mode variable optical attenuator or a single mode variable optical attenuator configured to adjust an amplitude of a received signal, a photosensitive detector 212, and/or a photodiode 214. Using the photosensitive detector 212, the receiver 114 is able to detect a signal location and convert the received optical signal from propagation path 216 into an electric signal using the photoelectric effect. The receiver 114 is able to track the received optical signal, which may be used to direct the steering mechanism 116 to counteract disturbances due to scintillation and/or platform motion. The system may process the signal output from the photosensitive detector 212 by, e.g., performing integration, low-pass filtering and/or window-based sampling. In the example of FIG. 2, the resultant signal is combined with output from the attenuator 210 and photodiode 214 at block 218. The combined signal may then be processed by a controller 220, and its output controls operation of the seed laser 202 and attenuator 206. For instance, each communication channel could be adjusted independently as well, for example, by adjusting the seed laser powers for each channel.

Returning to FIG. 1, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or an adjustment mechanism (e.g., a gimbal) configured to move the transmitter 112 and/or the receiver 114 with respect to the communication device. In particular, the steering mechanism 116 may be a MEMS 2-axis mirror, 2-axis voice coil mirror, or piezoelectric 2-axis mirror. The steering mechanism 116 may be configured to steer the transmitter, receiver, and/or optical signal in at least two degrees of freedom, such as, for example, yaw and pitch. The adjustments to the pointing direction may be made to acquire a communication link, such as communication link 122, between the first communication device 102 and the second communication device 130. To perform a search for a communication link, the one or more processors 104 may be configured to use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors 118. The one or more sensors 118 are configured to monitor a state of the first communication device 102. The one or more sensors may include, by way of example, an inertial measurement unit (IMU), encoders, accelerometers, and/or gyroscopes configured to measure one or more of pose, angle, velocity, torques, as well as other forces acting on the terminal. In addition, the one or more sensors 118 may include one or more sensors configured to measure one or more environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 130 includes one or more processors 132, memory 134 storing data 136 and instructions 138, a transmitter 140, a receiver 142, a steering mechanism 144, and one or more sensors 146. The one or more processors 132 may be similar to the one or more processors 104 described above. Memory 134 may store information accessible by the one or more processors 132, including data 136 and instructions 138 that may be executed by the processor(s). Memory 134, data 136, and instructions 138 may be configured similarly to memory 106, data 108, and instructions 110 described above. In addition, the transmitter 140, the receiver 142, the steering mechanism 144 and the sensors 146 of the second communication device 130 may be similar to the transmitter 112, the receiver 114, and the steering mechanism 116 described above.

Like the transmitter 112, transmitter 132 may include an optical transmitter, an amplifier, and an attenuator. As shown in FIG. 2, the transmitter 132 of communication device 130 includes a seed laser 222 configured to provide an amount of bandwidth for an output signal, an amplifier 224 such as an EDFA configured to increase an amplitude of the output signal, and an attenuator 226, e.g., a SMVOA or MMVOA configured to decrease the amplitude of the output signal. As shown in FIG. 2, amplifier 224 causes the output signal to be sent along the propagation path 216. As noted above for communication device 102, each communication channel sent from communication device 130 could be adjusted independently as well, for example, by adjusting the seed laser powers for each channel. Additionally, as shown in FIG. 1, transmitter 140 may be configured to output both an optical communication beam and a beacon beam. For example, transmitter 140 of the second communication device 130 may output a beacon beam 126 to establish a communication link 128 with the first communication device 102, which receives the beacon beam 126. The second communication device 130 may align the beacon beam 126 co-linearly with the optical communication beam (not shown) that may have a narrower solid angle or the same angle as the beacon beam and carries another communication signal. As such, when the first communication device 102 receives the beacon beam 126, the first communication device 102 may establish a line-of-sight with the second communication device 130 or otherwise align with the second communication device. As a result, the communication link 128, that allows for the transmission of the optical communication beam (not shown) from the second communication device 130 to the first communication device 102, may be established.

Like the receiver 114, the receiver 142 includes a tracking system configured to detect an optical signal as described above with respect to receiver 114. As shown in FIG. 2, the receiver 114 for the optical communication system of communication device 130 may include an attenuator 228, such as a single mode or multi-mode variable optical attenuator configured to adjust an amplitude of a received signal, a photosensitive detector 230, and/or a photodiode 232. Other components similar to those pictured in the first communication device 102 may also be included in the second communication device 130. For instance, using photosensitive detector 230, the receiver 142 is able to detect a signal location and convert the received optical signal into an electric signal using the photoelectric effect. As shown in the example of FIG. 2, signals from the photosensitive detector 230 and photodiode 232 are combined at block 234, and passed to both seed laser 222 and attenuator 226. The receiver 142 is able to track the received optical signal, which may be used to direct the steering mechanism 144 to counteract disturbances due to scintillation and/or platform motion.

Returning to FIG. 1, the one or more processors 132 are in communication with the steering mechanism 144 for adjusting the pointing direction of the transmitter 140, receiver 142, and/or optical signal, as described above with respect to the steering mechanism 116. The adjustments to the pointing direction may be made to establish acquisition and connection link between the first communication device 102 and the second communication device 130. In addition, the one or more processors 132 are in communication with the one or more sensors 146, such as is described above with respect to the one or more sensors 118. The one or more sensors 146 may be configured to monitor a state of the second communication device 130 in a same or similar manner that the one or more sensors 118 are configured to monitor the state of the first communication device 102.

As shown in FIG. 1, the communication links 122 and 128 may be formed between the first communication device 102 and the second communication device 130 when the transmitters and receivers of the first and second communication devices are aligned, or in a linked pointing direction. Using the communication link 122, the one or more processors 104 can send communication signals to the second communication device 130. Using the communication link 128, the one or more processors 130 can send communication signals to the first communication device 102. In some examples, it is sufficient to establish one communication link between the first and second communication devices, which allows for the bi-directional transmission of data between the two devices. The communication links in these examples are FSOC links. In other implementations, one or more of the communication links may be radio-frequency communication links or other type of communication link capable of traveling through free space.

Terminal Configurations

Figure 3:
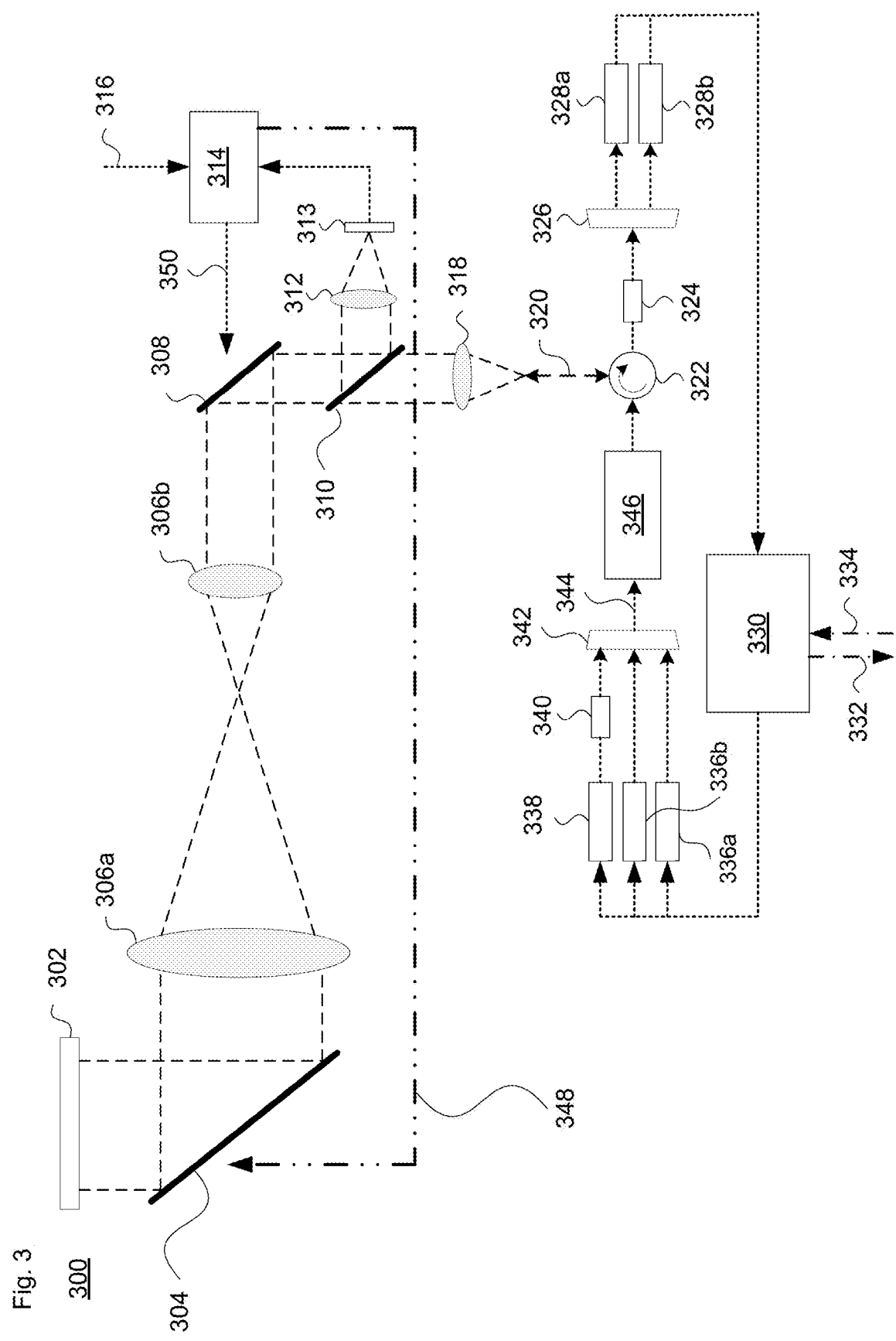
FIG. 3 is a block diagram for an FSOC terminal in accordance with aspects of the technology.

FIG. 3 illustrates a block diagram of an example configuration 300 for an FSOC terminal in accordance with aspects of the technology. While not intending to be limiting in any manner, in this example the terminal may have a monostatic design with a single 75 mm clear aperture for optical transmission and reception. Here, the terminal may emit three (or more) laser wavelengths (e.g., two (or more) for 10 Gbps telecom signals, and one beacon dedicated to tracking), and similarly receives three (or more) laser beams at different wavelengths (all of which may be within 100 nm of 1550 nm). Note that the signals transmitted on each wavelength may have different throughput and/or different modulation formats. Dashed lines in FIG. 3 indicate paths of laser beams received by and output from the terminal.

The receiver path is as follows. Three laser beams are incident on a terminal aperture window 302, which is desirably hydrophobically- and anti-reflection-coated, and then on a coarse pointing mirror (CPM) 304. The beams reflected off the CPM 304 go through a telescope with approximately 40× demagnification. The telescope in this example includes a first lens 306a and a second lens 306b. At the conjugate plane in the demagnified space, the beams are incident on a fast steering mirror (FSM) 308.

After reflecting off of the mirror 308, the beams are incident on a dichroic beam splitter 310, which reflects the beacon wavelength and transmits the two communications laser beams. The beacon laser that reflects off of the dichroic mirror is focused by lens 312 onto a position-sensing detector (PSD) 313, from which the center of the focused spot on the sensor plane can be calculated by a pointing, acquisition and tracking (PAT) module 314, such as a DSP. This input and information from one or more external sensors, as shown by dotted arrow 316, is used by the PAT module 314 as feedback for adjusting the pointing direction of the two mirrors (the CPM 304 and FSM 308). The beacon laser may be modulated at a low frequency (e.g., on the order of 1-3 KHz, or more or less) to allow for optical background and clutter rejection via narrowband filtering around the modulation frequency in the receiver processing chain, prior to computing the center of the signal beam.

The telecommunications beams (two wavelengths) that are transmitted through the dichroic beam splitter 310 are focused onto a fiber such as a multimode receiver fiber (dashed double arrow 320) via a collimator lens 318. The fiber-coupled beams are directed through a circulator 322 towards the receiver photonics components. Here, the beams may be first conditioned via an actively-controlled multimode variable optical attenuator (VOA) 324 to ensure the incident power on the downstream photodetectors are at an optimal threshold. Next, the telecommunications wavelengths are demultiplexed and filtered at block 326, and then detected via high-bandwidth and high-sensitivity avalanche photodiodes at blocks 328a and 328b. Post detection, the signals may be amplified, conditioned, and converted to bits via clock and data recovery (not shown). At block 330, a high-speed modem processor is configured to extract the data packets from the communication signals (e.g., Ethernet-type telecommunication signals) and send them out on one or more fiber-optic client ports 332.

The transmitter path is predominantly the reverse of the receiver path. For instance, client-side Ethernet or other communication traffic enters the terminal through one or more fiber optic ports 334. At block 330, the modem processor is configured to structure packets into frames that are optimized for transmission over the wireless optical channel. The frames of each communication channel are processed independently and then intensity modulated onto two seed lasers at block 336a and 336b. Beacon power can be adjusted relative to the communication beams via a variable optical attenuator (VOA) 340. The two laser beams, along with beacon laser beam generated at block 338 prior to VOA 340, are combined in a multiplexer 342. The combined three wavelengths in a single mode fiber (shown as dotted arrow 344) are amplified in an Erbium-doped optical amplifier (EDFA) 346, and then propagated into the third port of the circulator 322, such that they are emitted into free space from the same port that receives the light in the receiver path via terminal aperture window 302.

In this example architecture, the circulator 322 has three ports: a dual single- and multi-mode core bidirectional port that faces free space, a multimode receiver output port, and a single-mode transmitter input port. This circulator enables the system to operate in a monostatic configuration with single-mode transmission, yet, multimode reception, which is advantageous for terrestrial communications wherein the atmosphere causes significant wavefront and irradiance distortions. The three transmit beams traverse the optical path inside the terminal in the opposite direction, reflecting off the FSM 308 and the CPM 304, and then exit the terminal through the aperture 302. Dash-dot arrow 348 indicates that the PAT module 314 is configured to adjust the CPM 304, and dotted arrow 350 indicates that the PAT module 314 is also configured to adjust the FSM 308.

The line of sight between two terminals can be maintained by two-stage active tracking. The Coarse Pointing Mirror (CPM 304 in FIG. 3) has a primary responsibility to compensate for disturbances that are large in angle (e.g., on the order of degrees) but rather low in frequency (e.g., on the order of 1 Hz or lower). Examples include mount motion due to diurnal temperature changes or low frequency swaying of the pole due to wind. The fast steering mirror (FSM 308 in FIG. 3) compensates for disturbances that are high in frequency (~tens of Hz), but small in absolute angular range (e.g., on the order of tens-to-hundreds of μrads). Examples include vibrations from nearby equipment or higher frequency excitations in the mounting structure from wind.

Figure 4:
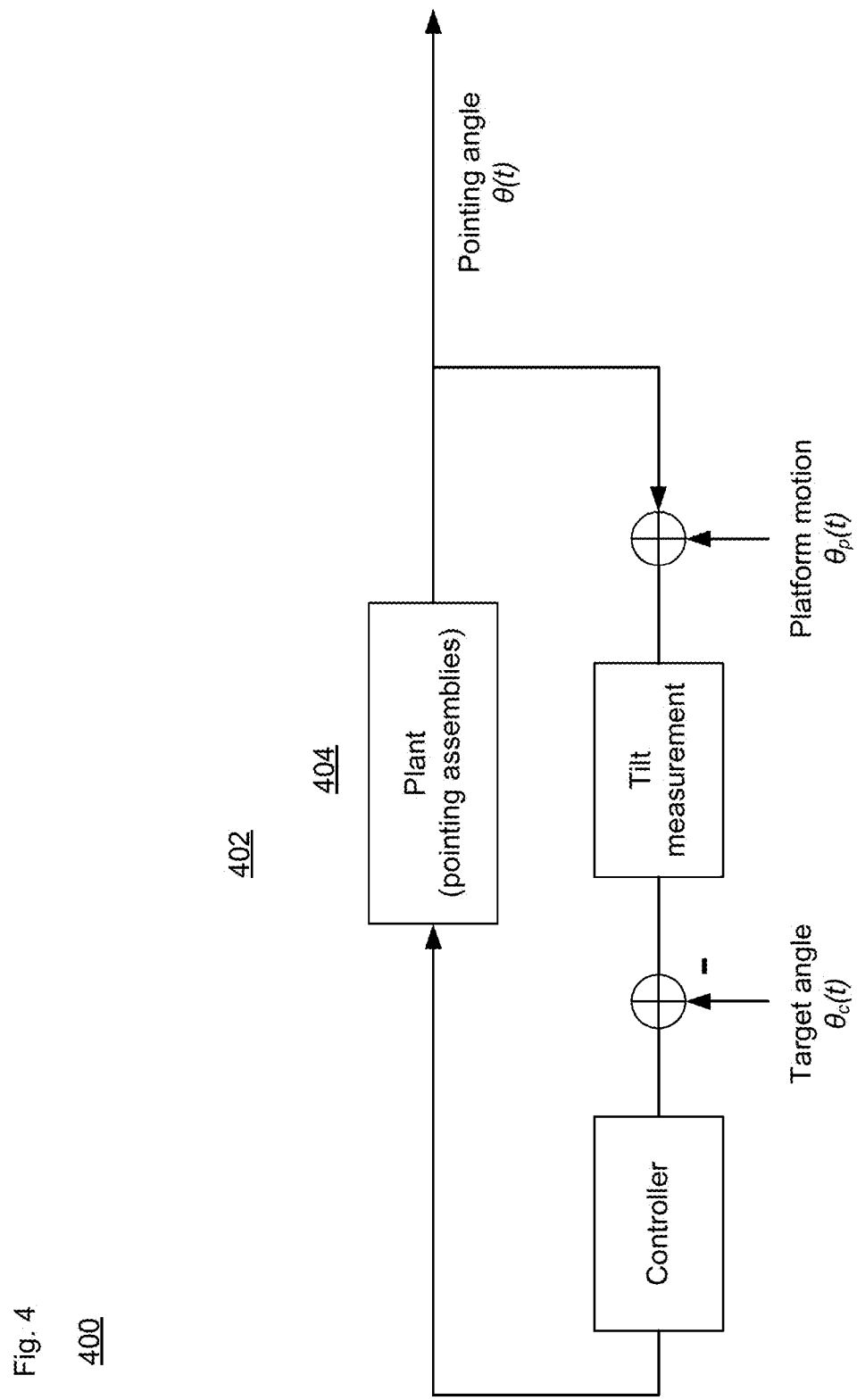
FIG. 4 illustrates an example of active tracking in accordance with aspects of the technology.

A controller (e.g., of PAT module 314) for the two-stage active tracking system can be described by the example 400 in the block diagram of FIG. 4. The tilt angle of beams entering a terminal have one-to-one correspondence to the center of the spot incident on the position-sensing detector (313 in FIG. 3). The signals obtained by this detector are first passband-filtered around the modulation frequency to reject out-of-band background and clutter, then demodulated to baseband, followed by processing to estimate the center of the spot. These estimates inform the controller (PAT module 314) of changes to the incidence angle of the beams arriving from the remote terminal due to platform motion ($\theta_p(t)$) as well as atmospheric beam wander ($\theta_c(t)$). A proper integration time is critical to obtain estimates with adequate signal-to-noise ratio. In one scenario, the beam-center estimates may be updated at the rate of hundreds of Hz, or more or less.

The difference between the beam-center estimate and the target tracking location on the position-sensing detector (corresponding to the optical boresight of the system) is the error signal (tilt measurement–target angle) that is input to the controller of PAT module 314. This controller is configured to command signals for the FSM 308 and CPM 304 of the pointing assemblies (plant) to try to drive the error signal to zero (or otherwise as low as possible). The resulting actuation of these two mirrors changes the arrival (and departure) angle of the laser beams (see resultant pointing angle $\theta(t)$) and closes the feedback loop.

According to one scenario, the terminals providing free-space optical communication can be deployed as telecommunications devices that pass traffic arriving through the fiber-optic client Ethernet ports. For instance, there may be multiple communication channels, each running 10G-base Ethernet independently from input to output. The modem core may employ forward error correction and hybrid automatic repeat request (ARQ) to ensure robust communication through the turbulent atmosphere. Note that there may be separate modem instances for each channel.

Automated Power Control

As noted above, terminals according to the technology described herein may operate in highly-varying environmental conditions autonomously without human intervention. In order to accomplish this, the system is able to implement the following automation features.

One such feature is the automatic adjustment of transmitter power over, e.g., 30 dB dynamic range in some examples, or between 20 dB to 45 dB (or more) in other examples, as channel attenuation varies due to changing weather and/or other conditions. Terminal pairs in a link are configured to exchange necessary information about the state of their systems to enable automatic and dynamic optimization of the transmitted optical power for robust link operation.

Figure 5:
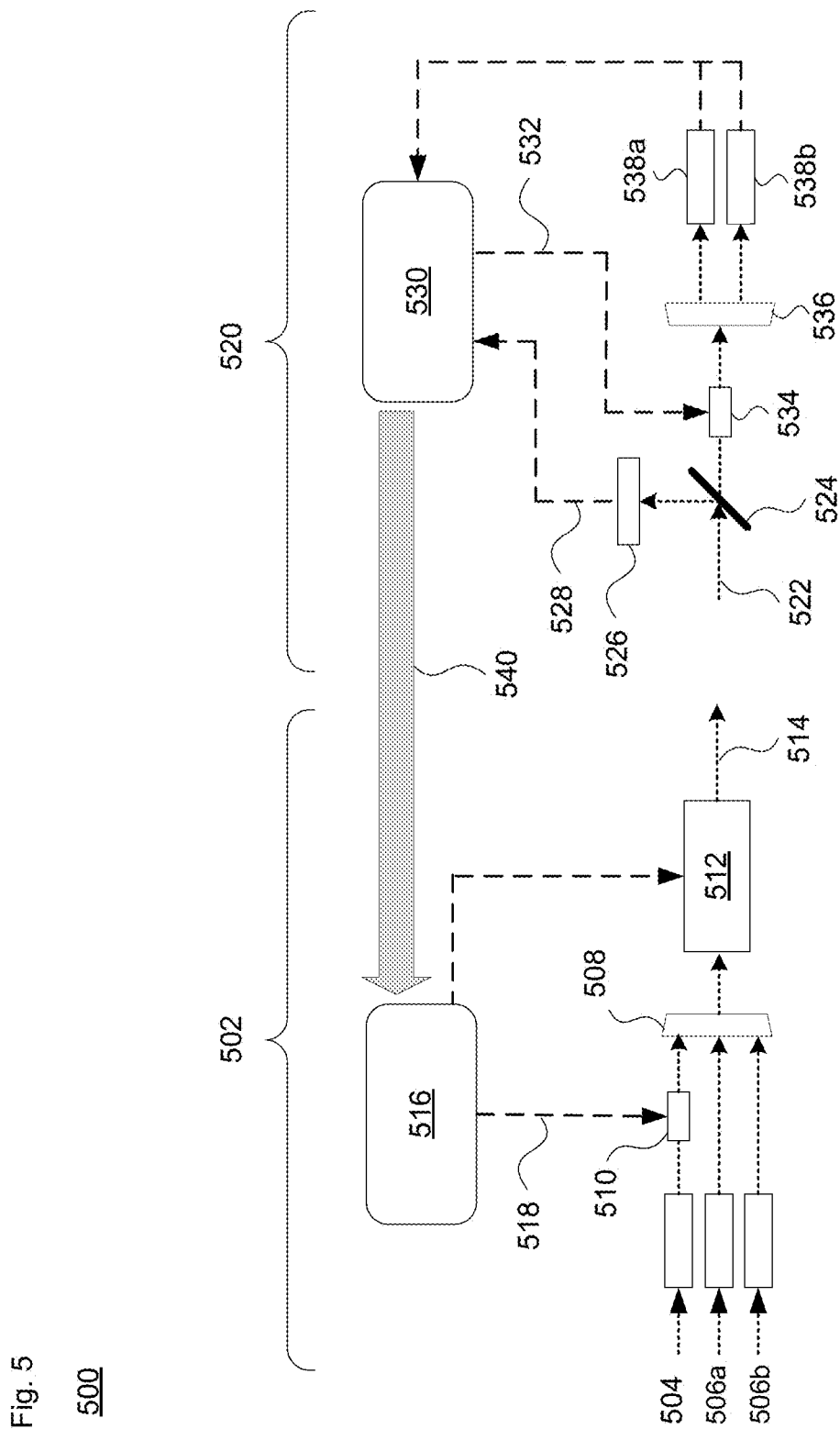
FIG. 5 illustrates transmitter and receiver power optimization in a link in accordance with aspects of the technology.

FIG. 5 illustrates an example block diagram 500 of transmitter and receiver power optimization in a link. Each terminal monitors key system parameters and exchanges state information with the other terminal to adjust operating setpoints. In this illustration, only the transmit path is shown for a first terminal 502, and only the receive path is shown for a second terminal 520. Here, beacon transmit signal 504 and the communication transmit channels 506a and 506b are combined via multiplexer 508 (such as multiplexer 342 discussed above with regard to FIG. 3). The beacon transmit signal 504 is attenuated by attenuator 510, e.g., a variable optical attenuator (such as VOA 340 of FIG. 3) prior to multiplexing. As discussed above with regard to FIG. 3, the wavelengths of these signals may be combined in, e.g., a single mode fiber and may then be amplified in an optical amplifier 512 (such as an EDFA), and then subsequently emitted as shown by dotted line 514 for transmission into free space via the aperture window of the first terminal. As illustrated in FIG. 5, a power control block 516 can cause adjustments to the attenuator 510 via a signal 518.

On the receive side, the second terminal 520 receives a free space optical signal via its aperture window. After passing through the optical elements discussed above for FIG. 3, the input beams 522 are incident on a beam splitter 524 such as a dichroic beam splitter, which reflects the beacon wavelength and transmits the two communications laser beams. The beacon laser that reflects off of the dichroic mirror is focused onto a position-sensing detector (PSD) 526, which passes the resultant information 528 to a power monitoring block 530 (of, e.g., the tracking (PAT) module 314 of FIG. 3). The power monitor block 530 is configured to output a control signal 532 to adjust optical attenuator 534 (e.g., VOA 324 of FIG. 3). The attenuated communication signal(s) from the optical attenuator 534 are demultiplexed and filtered at block 536. The signals are then detected via high-bandwidth and high-sensitivity avalanche photodiodes at blocks 538a and 538b. Post detection, the outputs of the photodiodes may be provided to the power monitoring block 530 (in addition to being processed by a high-speed modem processor as discussed above with regard to block 330 of FIG. 3). Then, as shown by arrow 540, the power monitoring block 530 of the second terminal 520 is able to provide power adjustment feedback to the power control block 516 of the first terminal. This feedback may be, e.g., in band (optical) or out of band (RF).

Automated State-Based Power Control

For automated conditioning of received optical power, the system can actively monitor short-time-averaged power incident on the receiver photodetectors, and control the variable optical attenuator at a rate on the order of KHz (e.g., 1 KHz-5 KHz, or more or less) to maintain optimal power levels for operation in the presence of fast power fluctuations (e.g., scintillation or rain). This compresses the dynamic range of observed power fluctuations, can also ensure photodetectors are not damaged from excessive incident power and can keep the tracking beam with the stable bounds of accurate position detection.

The system is also able to perform an automatic restart and reacquisition of a link after a long outage (e.g., due to power loss or fog). For instance, poor visibility conditions could result in hour-long outages where the attenuation along the link is too severe to close a link. In these instances, the terminals may automatically save the last known operating state of the link (e.g., pointing angles for the CPM and FSM, power levels for the transmitter), and then periodically (asynchronously) attempt to reacquire the link when the weather conditions improve. The state information is used as either initial conditions or as inputs for the reacquisition process. Thus, the terminals are able to use the state information to re-initialize and reacquire a link automatically after loss of power, without human intervention. By way of example, CPM and FSM angles may be used directly by a controller as starting values, but power output (e.g., EDFA and/or VOA settings) may be suggested inputs. Various parameters (e.g., distance from link setup, or channel temperature and/or other environmental factors) determine how to bound the output power to maintain safe operation. In this example, if output power is less than a threshold that's a function of parameters, the controller may keep the original power; however, if the power is greater than a threshold that's a function of parameters, it may limit the power to some bounded value.

In a non-state-space approach, the process takes physical layer measurements as inputs and outputs a new power setpoint. In this approach, there is no notion of a "state" that the system is in. However, a more robust approach is state-based. Here, the behaviors depend on the environment and various states of both terminals (as opposed to just power in a stateless approach). For instance, examples of additional data sent over from the receive terminal to the transmitter terminal can include one or more of the following: terminal control state, terminal motion, power statistics, tracking statistics, etc. There can be different system behaviors based on changes in environmental conditions. For instance, there may be a "Wind" state, which gives less weight to average power measurements due to reduced accuracy in the measurements due to swaying or other movement of the terminal caused by the wind, or instability of the tracking system caused by fast fluctuations of the received power. A "Rain" state may result in modifying the behavior of the power control algorithm to take into account additional tracking jitter caused by the presence of scattering light from rain. Both types of states may cause a change to the power adjustment behavior.

One or more adaptive setpoints can be used to make adjustments to beacon power (for a tracking system) based on information from the communication link (e.g., communication throughput and error rate). This adds resilience and robustness to device-to-device variations in performance (e.g., power vs. sensitivity may be different for each terminal), as well as a more direct measure of environmental conditions (e.g., the method is resilient to the channel causing changes to the reliability of physical layer measurements such as the average power).

The adaptive setpoints are also able to adjust the communication link power setpoint, depending on the fraction of observed outages. For instance, one goal may be to keep the lowest setpoint of the two, such that outages are <1% in order to provide substantially error-free communication. This is based off of the forward error correction (FEC) error rate. In one scenario, the setpoint adjusts over time with a small decay factor (a "forgetting" factor) multiplying the power error from the desired setpoint, to allow the communication link power setpoint to continually adjust while remaining as low as possible to maintain suitable communication, which allows maximum power to the tracking system's beacon. Allowing the communication link power setpoint to be as low as possible can provide an additional benefit of extending the operational life of electro-optic components including lasers and optical amplifiers. After some time, the forgetting factor causes the setpoint to revert to its default state, with a time constant correlated with known channel fluctuations caused by nominal atmospheric scintillation and pointing jitter. Certain state transitions may also cause the setpoint to revert as well, so that the system does not re-acquire the link in calm conditions with an extremely high setpoint that was needed previously but which is not needed in present conditions. Thus, according to one aspect, the maximum increase of the dynamic setpoint can be limited to prevent highly dynamic situations from causing it to increase to a level that could result in damage to components of the terminal.

In view of this, the state-based approach provides a power adjustment loop that attempts to maintain tracking and communications laser SNR at a suitable level for optimal tracking performance, and optimal data throughput (respectively). Thus, as channel properties vary due to weather conditions over a large range (e.g., on the order of up to 40 dB or more), and fluctuates with different day/night properties depending on link distance, the power control loop provides an autonomous correction mechanism to maintain received power in valid ranges (sufficient SNR above an operating threshold). This helps to avoid saturation and damage to sensitive photodetectors.

For the tracking beacon received power, the desired receive setpoint may be selected such that expected scintillation does not commonly cause fades (when the power drops below noise threshold) or surges (when the power increases beyond bias-free level). For the communications laser received powers, the desired receive setpoint may be selected such that expected scintillation does not cause power to drop below the forward error correction (FEC) error threshold for which error-free communication is available.

Thus, it can be seen that there are two different setpoints. The state-based power control loop is configured to control power to the beacon and communication channels independently, e.g., via a SMVOA, and an EDFA. The beacon and comms wavelengths pass through a 2-degree of freedom power control, to adjust power to beacon and communication channels independently. In an example case, SMVOA could be configured to attenuate either the communication channels or the beacon, while an EDFA amplifies all wavelengths (with approximate equal gain for these wavelengths), so that the beacon and the communication channels can be set to reach their corresponding setpoints. Furthermore, the system may support individual control for balancing of multiple communication channels.

In the case that the received power drops on either/both the beacon and/or the communication channels, the remote terminal's SMVOA and EDFA (or equivalent components) are adjusted to compensate for this power drop and maintain power near the desired setpoints (up to the limit of maximum available power). In the case that the received power increases on either/both the beacon and/or the communication channels, the SMVOA and EDFA are adjusted to compensate for this power increase, and maintain power near the desired setpoints (down to the limit of the minimum, non-zero achievable power output). Note that it may be more common to compensate for a drop in receive power, e.g., due to rain, fog, etc.

In this approach, since a remote terminal acts as a remote sensor for the local terminal's transmit beam, an out-of-band supervisory/management channel may be active between the two terminals. However, for certain situations, an in-band channel would be sufficient.

Given the above, the power control loop technology allows for independent algorithms that can vary the SMVOA and EDFA (or equivalent components) based on channel and environmental conditions. For example, as explained further below there may be a "Fade" state where the power drops below a noise threshold and a "Surge" state where power increases beyond bias-free level, as well as one or more "Unstable" states for wind and other special cases that require specific handling of beacon and communication channel power. These states can be triggered by measured or inferred knowledge of the channel state and environment. For instance, an onboard IMU can be used as an input for the Unstable state. Furthermore, a "Pause" state may be used to handle how the link behaves when the system is trying to recover operation during an outage. By way of example, in the Pause state, the system could perform an automatic restart and reacquisition of a link after a long outage such as due to power loss or fog.

The system may be configured to perform obstacle detection, which involves detecting temporary objects. Here, upon detection of a temporary object, the system may not attempt to increase power to compensate since that object is expected to disappear shortly. Examples of temporary objects include birds, objects passing through the optical beam, ship masts on over-water paths, etc. Obstacle detection uses power loss and metrics to determine non-weather events. In one example, the system may look for uniformity in the drop of all of the wavelengths to ensure that this a loss due to an obstacle as opposed to a loss due to pointing error or another phenomenon.

If the power fluctuation exceeds a certain bandwidth or magnitude threshold that is known to fall outside of natural changes occurring in the atmosphere (e.g., fades due to rain or fog), then the power control loop process can be held frozen (static) for a certain minimum duration instead of reacting to the observed power drop. After that duration, the power available fraction (% of time that full power is available) is monitored until passing a threshold inside a predetermined duration (e.g., until a solid object has departed), at which point the power control loop would then re-engage and assume that the obstacle has passed. This approach could be employed in a wide variety of situations that distinguish atmospheric events from physical non-atmospheric interference.

Figure 6:
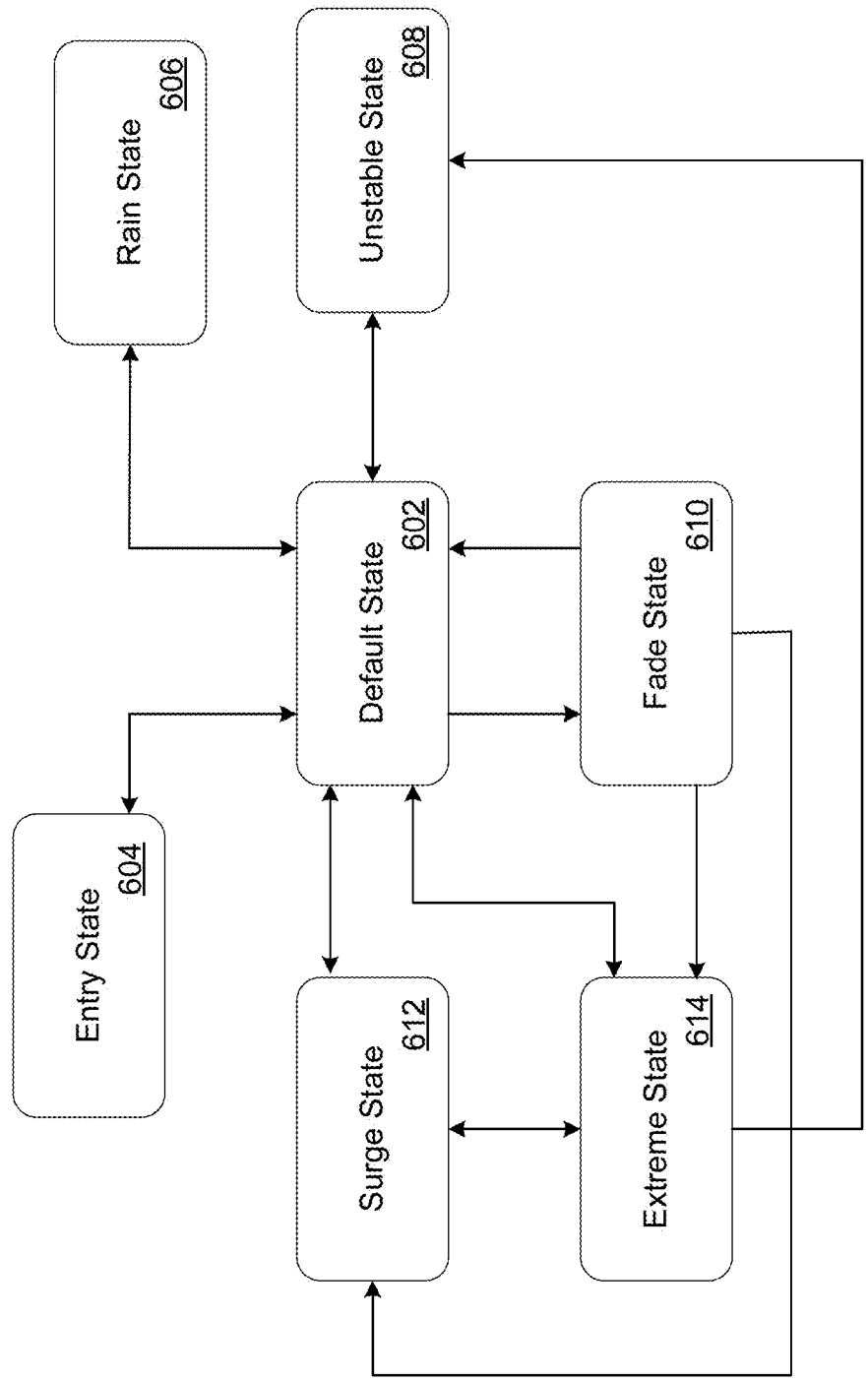
FIG. 6 is an example of state-based power control in accordance with aspects of the technology.

FIG. 6 illustrates an example state diagram 600 of a power control loop in accordance with the above. As shown, there are a number of states including a default state 602, an entry state 604, a rain state 606, an unstable state 608, a fade state 610, a surge state 612 and an extreme surge state 614. The default state here provides for standard operation of the power control loop. According to one aspect, the power control loop can assess how fresh (current) the incoming data is, and automatically discard data that is outside a time boundary (e.g., older than X seconds or milliseconds). This would account for an out-of-band communication link with extremely high latency, or an in-band communication system where the ARQ is highly active. It can prevent adjustment of the power setpoints on data that is no longer relevant to the current operation of the system.

The entry state 604 that allows for start/stop/pause and updates from the main controller of the system. The system would be in this state during initial link acquisition, automated recovery, or when the link is down due to atmospheric conditions. It restores/resets adaptive setpoints, and can be used to reset EDFA and/or VOA setpoints based on the automated recovery. It can also prevent adjustment of the power outside of that so that the settings do not become unreasonable for re-acquisition of the link when adverse conditions subside. Thus, in one example, during automated startup after a terminal power outage, the main controller would evaluate various parameters (e.g., distance from link setup, channel temperature and/or other environmental factors), and determine how high to allow the output power to be and independent of what the output power was before the terminal shut down. Thus, in this example, if power<threshold, the controller would keep the original power, but if power>threshold, it would clip the power at the threshold.

In the rain state 606, the system looks for an error in the tracking system where the position feedback appears that tracking is in a good state, but the system is unable to maintain sufficient light into the communication channel. This may be caused during certain rain conditions when the wavefront has multiple peaks/hotspots in power, such as by having an excess of transmit power that allows the secondary hotspots to have enough power that the tracking system is able to lock onto a spot other than the center of the beam. This state can be detected upon a step change in the average delta of receive power between the beacon/PSD and the communication channel. The state can additionally be gated by the variance of the beacon PSD, with feedback from the pointing error, to distinguish this situation from poor pointing performance that could due to high wind or an unstable mount.

In the unstable state 608 (also known as the wind state) it may be expected that the tracking system in unable to compensate for wind-related disturbances present on the mount. Entry into this state may be both preemptive and reactive. For instance, the system may preemptively use the local IMU measurement(s) to enter the wind state prior to the disturbance of the system moving outside the known bounds of the tracking system (e.g., before wind gusts exceed a threshold). In this state, the system can reactively use the variance of the remote received power to detect unstable tracking of the remote system. In the wind state, the power readback may not reliable because the beam is moving on and off the aperture rapidly. In this state, the length of the average power may be expanded to account for that. The EDFA power may be dropped and capped to a lower maximum setting to prevent increasing power due to inaccurate power readback. The rate at which the variable optical attenuator is controlled can also updated so that the system does not increase the fluctuations of the beacon power as a reaction of the beam wander.

The fade state 610 is employed to detect when the update rate of the control of the VOA and/or EDFA may be insufficient to stabilize the received power on the link. In this state, the system detects entry based on the average error of the received power versus the desired setpoint of the power control loop. Under normal system operating conditions (e.g., in the default state 602) an update at this speed could cause unnecessary adjustments, but in the fade state 610 this allows the system to up to the maximum adjustable response time of the EDFA and/or VOA in order to maximize the power margin and stabilize the link as long as possible when weather conditions are rapidly changing, thereby maximizing the communication system availability. The system will exit the fade state when the system is able to maintain the setpoint or the link goes down due to weather conditions that exceed the margin of the system.

The surge state 612 deals with saturation conditions. Minor saturation may be due to a weather condition that lifts rapidly, causing the received power to spike. Or if the link had previously been down and the system suddenly reacquires as the weather lightens up, it can also encounter a saturation of power, since the last operating point of the power setpoints is no longer relevant in present conditions. When the system is slightly saturated, the point performance may be suboptimal. In unstable tracking, there can also be inaccurate readback of the power measurements. The power control loop in this state can cause the system to do a number of things to account for this. For instance, the system can adjust the update rate of the VOA and decrease the number of power samples it uses so that it can stabilize the tracking system sooner, and thus provide stable power to the communication system. Additionally, while operating in this state, the system can prevent increase to the EDFA and beacon power levels, which can happen due to power readback when surging, so that the system is not pushed further into a surge condition.

The extreme surge state 614 can be employed when there is no expectation of reliable feedback of the power, and the tracking system may be unstable. That could lead to degradation of the communication channel, or damage of the communication channel receivers due to excess power and pointing errors that product fast fluctuations on the communication receivers, which the system's additional protection mechanism may not be able to compensate for. Similar to the surge state 612, the power control loop in the extreme surge state 614 can cause the system to do a number of things to account for these issues. For instance, it can adjust the update rate of the VOA and decrease the number of power samples it uses so that the system can stabilize the tracking system sooner, and provide stable power the communication system. These are different settings than the minor surge scenario above, which push VOA response to a faster rate, but are optimized to prevent instability by adjusting them too fast. Additionally, the extreme surge state 614 can prevent increase to the EDFA and beacon power levels, which can happen due to power readback when surging, so that the system is not pushed further into an extreme surge condition.

Figure 7B:
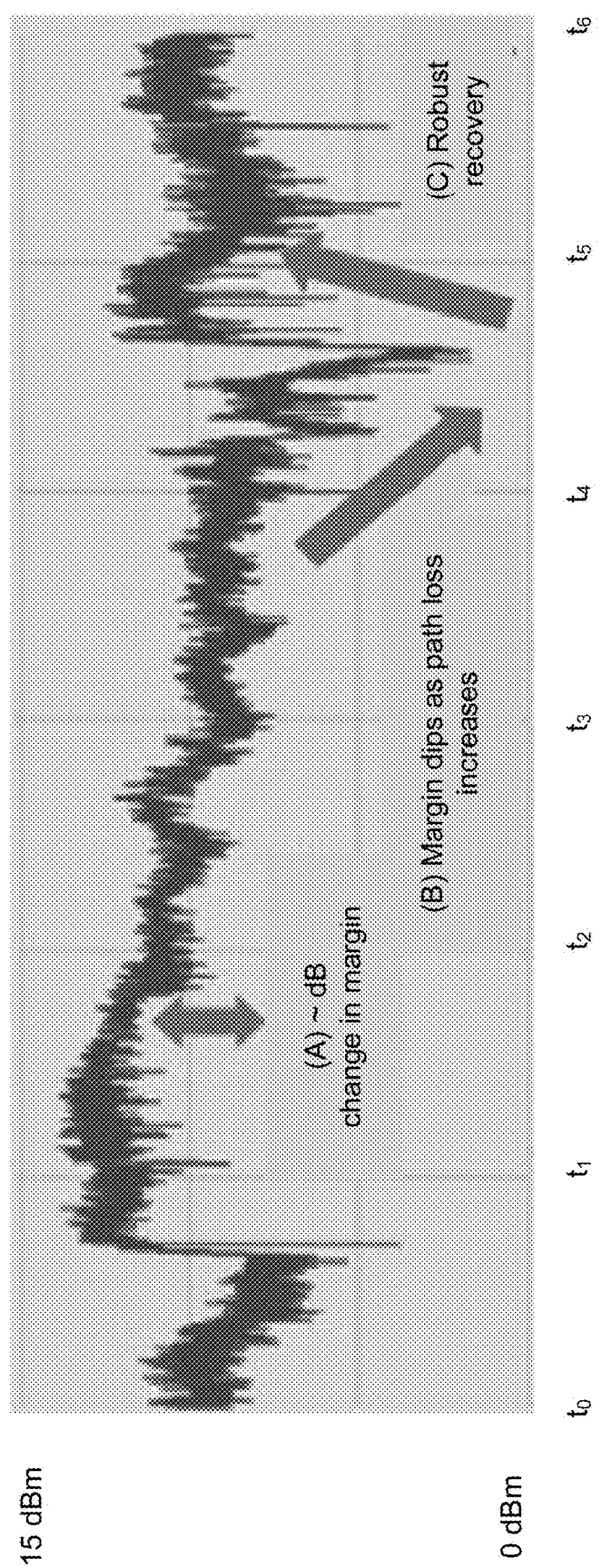

FIGS. 7A-B show an example of dynamic power adjustment from an operating link in accordance with state-based power control as discussed above. FIG. 7A illustrates a plot showing the optical amplifier gain being adjusted over a range of approximately 20 dB, while the receiver operating margin remains constant (A). Link conditions continue to deteriorate after the transmitter power is maximized (B). As link conditions improve, the system reduces the transmitter power to restore the target operating margin (C). FIG. 7B illustrates corresponding operating margin across A, B and C, between 0 dBm and 15 dBm. Here, the double arrow for (A) illustrates a change in margin in a first time period between $t_1$ and $t_2$, the downward arrow for (B) shows that the margin dips as path loss increases around time $t_4$, and per the upward arrow for (C) there is a robust recovery at time $t_5$.

Example Terminal System

Figure 8:
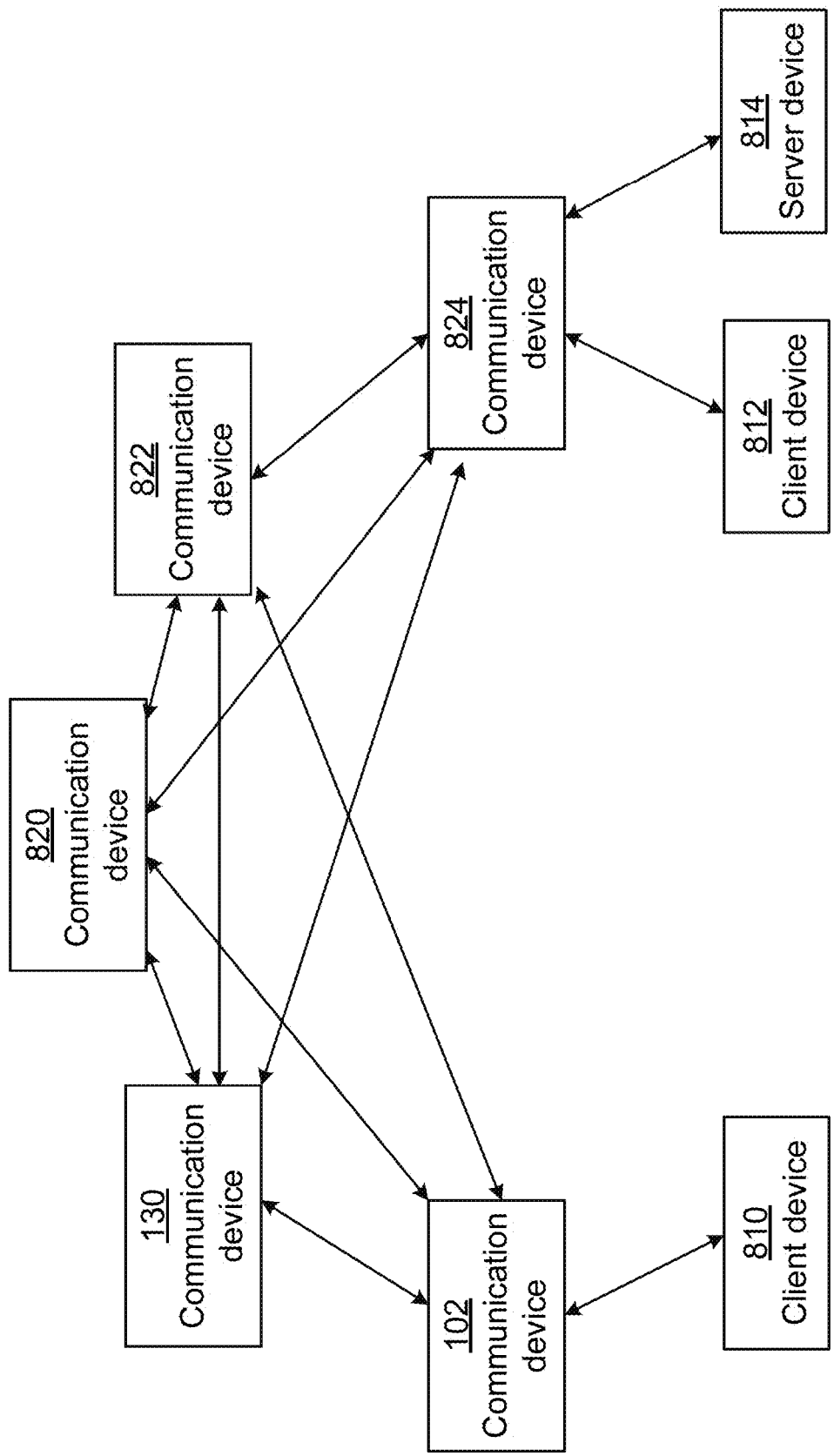
FIG. 8 is a pictorial diagram of a network 800 in accordance with aspects of the disclosure.

FIG. 8 illustrates an example showing a plurality of communication devices, such as the first communication device 102 and the second communication device 130, which may be configured to form a plurality of communication links (illustrated as arrows) between a plurality of communication terminals, thereby forming a network 800. The network 800 may include client devices 810 and 812, server device 814, and intermediary communication devices 102, 130, 820, 822, and 824 between a given client device and a server device, or between two client devices. Each of the client devices 810, 812, server device 814, and communication devices 820, 822, and 824 may include one or more processors, a memory, a transmitter, a receiver, and a steering mechanism similar to those described above. Using the transmitter and the receiver, each communication device in network 800 may form at least one communication link with another communication device, as shown by the arrows. The communication links may be for optical frequencies, radio frequencies, other frequencies, or a combination of different frequency bands. In FIG. 8, the communication device 102 is shown having communication links with client device 810 and communication devices 130, 820, and 822. The communication device 130 is shown having communication links with communication devices 102, 820, 822, and 824.

The network 800 as shown in FIG. 8 is illustrative only, and in some implementations the network 800 may include additional or different communication terminals. By way of example, the network 800 may be a terrestrial network where the different communication devices are respectively associated with a plurality of ground communication terminals. In other implementations, the network 800 may include communication terminals that are part of one or more high-altitude platforms (HAPs), which may be balloons, blimps or other dirigibles, airplanes, unmanned aerial vehicles (UAVs), or any other form of high-altitude platform such as those configured to operate in the stratosphere, or other types of moveable or stationary communication terminals. Alternatively or additionally, one or more terminals may be disposed on satellites orbiting the Earth. In some implementations, the network 800 may serve as an access network for client devices such as cellular phones, laptop computers, desktop computers, wearable devices, tablet computers, netbooks, etc. The network 800 also may be connected to a larger network, such as the Internet, and may be configured to provide a client device with access to resources stored on or provided through the larger computer network.

Example Method

Figure 9:
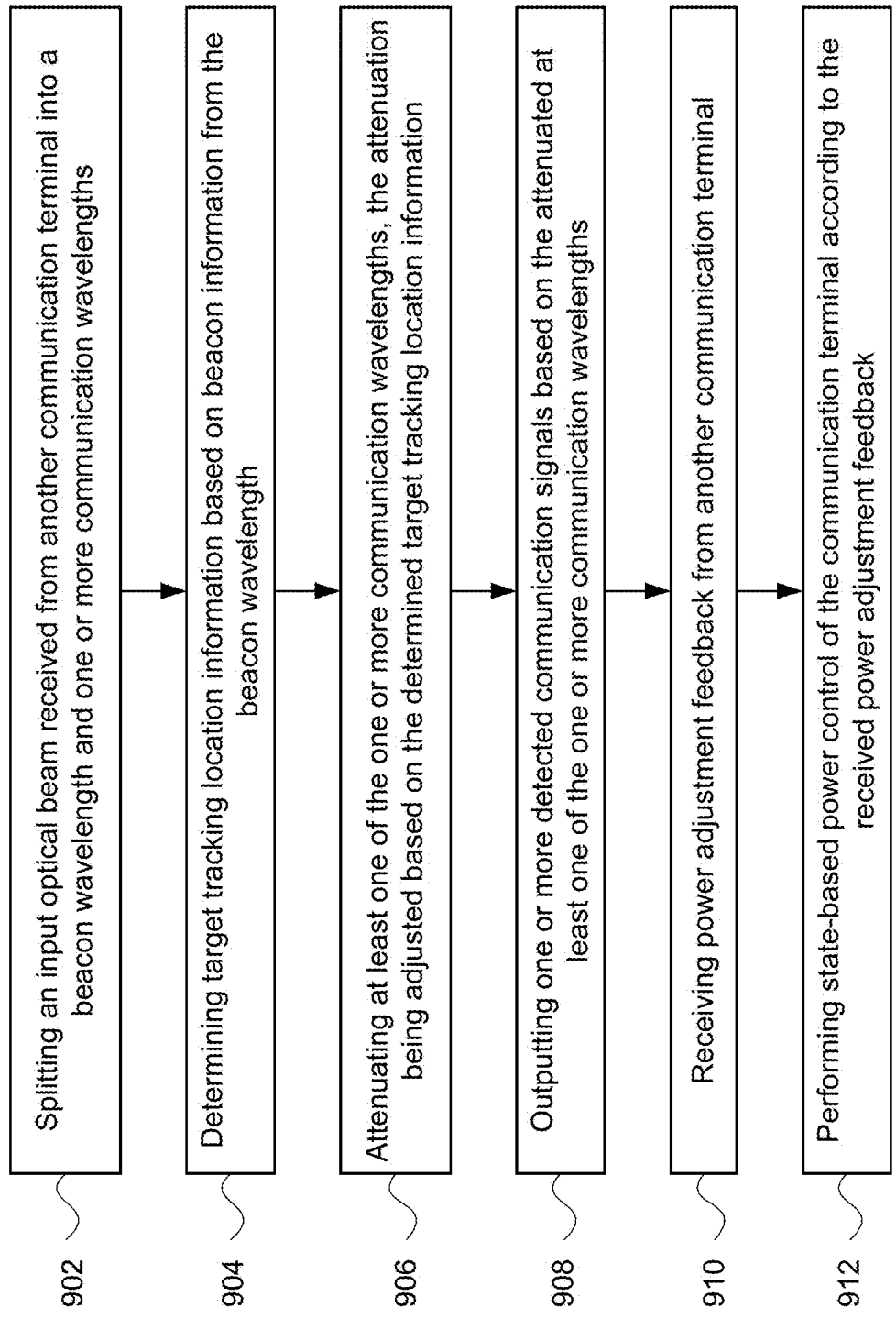
FIG. 9 is a flow diagram 900 depicting a method in accordance with aspects of the disclosure.

FIG. 9 is a flow diagram 900 illustrating a state-based method of controlling a communication terminal configured to receive free space optical signals. At block 902 the method comprises splitting an input optical beam received from another communication terminal into a beacon wavelength and one or more communication wavelengths. At block 904, the method includes determining target tracking location information based on beacon information from the beacon wavelength. At block 906 the method includes attenuating at least one of the one or more communication wavelengths, in which the attenuation is adjusted based on the determined target tracking location information. At block 908 the method includes outputting one or more detected communication signals based on the attenuated at least one of the one or more communication wavelengths. At block 910 the method includes receiving power adjustment feedback from another communication terminal. And at block 912 the method includes performing state-based power control of the communication terminal according to the received power adjustment feedback.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A communication terminal configured to receive free space optical signals, the communication terminal comprising:
   a beam splitter configured to split an input optical beam received from another communication terminal into a beacon wavelength and one or more communication wavelengths;
   a position-sensing detector configured to receive the beacon wavelength from the beam splitter and to determine target tracking location information;
   an optical attenuator configured to receive the one or more communication wavelengths from the beam splitter and to attenuate at least one of the one or more communication wavelengths;
   a power monitoring block configured to receive the determined target tracking location information and to output a control signal to adjust the optical attenuator for the attenuation of the at least one of the one or more communication wavelengths; and at least one photodiode configured to receive the attenuated at least one communication wavelength and output one or more detected communication signals;

wherein the power monitoring block is further configured to receive power adjustment feedback from a power control block of the other communication terminal and to perform state-based power control of the communication terminal according to the received power adjustment feedback.

2. The communication terminal of claim 1, wherein the power monitoring block of the communication terminal is further configured to receive the one or more detected communication signals output by the at least one photodiode.

3. The communication terminal of claim 1, wherein:
the one or more communication wavelengths are a plurality of communication wavelengths;
the at least one photodiode is a plurality of photodiodes each configured to receive one of the plurality of communication wavelengths; and
the optical attenuator is configured to separately attenuate each of the plurality of communication wavelengths.

4. The communication terminal of claim 3, further comprising a demultiplexer configured to receive each of the plurality of communication wavelengths from the optical attenuator and to demultiplex the plurality of communication wavelengths prior to reception by the plurality of photodiodes.

5. The communication terminal of claim 1, wherein the power monitoring block is configured to calculate a center of a focused spot on a sensor plane for the input optical beam.

6. The communication terminal of claim 1, wherein the feedback is an in-band optical signal.

7. The communication terminal of claim 1, wherein the feedback is an out-of-band radio frequency signal.

8. The communication terminal of claim 1, wherein the power monitoring block is further configured to provide outbound power adjustment feedback to the power control block of the other communication terminal.

9. The communication terminal of claim 1, wherein the received power adjustment feedback includes at least one of a terminal control state, terminal motion, a power statistic, or a tracking statistic.

10. The communication terminal of claim 1, wherein the state-based power control comprises a default state and multiple discrete states including a rain state, a fade state, a surge state and an unstable state.

11. A state-based method of controlling a communication terminal configured to receive free space optical signals, the method comprising:
splitting an input optical beam received from another communication terminal into a beacon wavelength and one or more communication wavelengths;

determining target tracking location information based on beacon information from the beacon wavelength;

attenuating at least one of the one or more communication wavelengths, the attenuation being adjusted based on the determined target tracking location information;

outputting one or more detected communication signals based on the attenuated at least one of the one or more communication wavelengths;

receiving power adjustment feedback from another communication terminal; and performing state-based power control of the communication terminal according to the received power adjustment feedback.

12. The method of claim 11, wherein performing the state-based power control includes re-initializing and reacquiring a link with the other communication terminal automatically after loss of power, without human intervention.

13. The method of claim 12, wherein the state-based power control is performed based on (i) at least one of a course pointing mirror angle or a fast steering mirror angle as a starting value, and (ii) at least one of an amplifier or an attenuator setting for power output.

14. The method of claim 12, wherein the state-based power control includes bounding output power based on at least one of a distance from link setup or a channel temperature.

15. The method of claim 11, wherein the state-based power control comprises a default state and multiple discrete states including a rain state, a fade state, a surge state and an unstable state.

16. The method of claim 15, wherein the multiple discrete states further include an entry state during initial link acquisition, automated recovery or when the link is down due to an atmospheric condition.

17. The method of claim 15, wherein operation in the rain state includes looking for an error in a tracking system of the communication terminal where position feedback indicates that tracking satisfies a selected criterion but the communication terminal is unable to maintain sufficient light into a communication channel.

18. The method of claim 15, wherein operation in the unstable state includes the communication terminal reactively using variance of power information received from the other communication terminal to detect unstable tracking of the other communication terminal.

19. The method of claim 15, wherein operation in the fade state includes detecting when an update rate of control of an attenuator or an amplifier of the communication terminal is insufficient to stabilize received power for the other communication terminal.

20. The method of claim 15, wherein operation in the surge state includes evaluating power saturation conditions associated with either the communication terminal or the other communication terminal.

* * * * *